United States Patent [19]

Massoth et al.

[11] 4,009,009

[45] Feb. 22, 1977

[54] PROCESS FOR REDUCING THE COS CONTENT OF GASEOUS HYDROCARBON STREAMS BY USE OF SUPPORTED LEAD OXIDE

[75] Inventors: Franklin E. Massoth, Salt Lake City, Utah; John E. Young, Jr., Woodridge, Ill.

[73] Assignee: Gulf Research & Development Company, Pittsburgh, Pa.

[22] Filed: Apr. 28, 1975

[21] Appl. No.: 572,427

Related U.S. Application Data

[63] Continuation-in-part of Ser. No. 492,276, July 26, 1974, abandoned.

[52] U.S. Cl. .................................. 55/73; 55/74
[51] Int. Cl.² .................................. B01D 53/04
[58] Field of Search ............ 55/73, 74; 208/88, 91; 252/454, 461, 469; 423/230, 244

[56] References Cited

UNITED STATES PATENTS

| 1,812,527 | 6/1931 | Gross et al. | 423/244 X |
| 2,442,982 | 6/1948 | Nachod | 423/244 X |
| 3,782,076 | 1/1974 | Carr et al. | 55/74 |
| 3,789,581 | 2/1974 | Carr et al. | 55/73 |
| 3,812,653 | 5/1974 | Mossoth et al. | 55/74 X |

*Primary Examiner*—Charles N. Hart
*Assistant Examiner*—Robert H. Spitzer

[57] ABSTRACT

This invention relates to the removal of COS from gaseous streams and more particularly for reducing the COS content of gaseous streams free of arsenic by the use of an oxide of lead.

14 Claims, No Drawings

PROCESS FOR REDUCING THE COS CONTENT OF GASEOUS HYDROCARBON STREAMS BY USE OF SUPPORTED LEAD OXIDE

This application is a continuation-in-part of U.S. application Ser. No. 492,276 to Franklin E. Massoth and John E. Young, Jr., now abandoned and assigned to the same assignee as the present invention.

BACKGROUND OF THE INVENTION a. Field of the Invention

Sulfur compounds in various forms are known as catalyst poisons in some petroleum processing schemes. Thus, for example, platinum containing catalysts useful for the selective hydrogenation of acetylenes in gaseous hydrocarbon streams are susceptible to sulfur poisoning. Many gaseous hydrocarbon streams are made by the cracking of heavier sulfur containing feedstocks. The gaseous products contain normally gaseous sulfur compounds such as, for example $H_2S$, mercaptans and COS. Carbonyl sulfide is a colorless and odorless gas and is always formed when carbon, oxygen and sulfur or their compounds, such as CO, $CS_2$, and $SO_2$ are brought together at high temperatures, e.g. 932° to 1652° F. (500° to 900° C.). The complete removal of sulfur compounds such as $H_2S$ or mercaptans is fairly standardized using amines and/or aqueous solutions of alkali metal hydroxides. Unfortunately the COS is very difficult to remove, for it reacts only slowly with the amines or alkali metal hydroxides. Other techniques are therefore required to effect more efficient COS removal.

b. Description of the Prior Art

U.S. Pat. No. 3,782,076 to Carr et al suggests the use of a supported lead oxide material for reducing the arsenic content of gaseous hydrocarbon streams. While the Diluent Gas No. 3 shown in Column 7, lines 15–28, of the Carr et al patent lists among its components from 0 to 2 ppm of $H_2S$ and 0 to 5 ppm of COS, there is no teaching in Carr et al that a gas containing COS was for a certainty employed, and there is absolutely no teaching of any kind in the Carr et al patent that even if COS is present, the lead oxide sorbent will serve to remove sulfur compounds of any kind from the gaseous hydrocarbon feedstream.

SUMMARY OF THE INVENTION

It has now been discovered in accordance with the invention that a suitably dispersed material comprising an oxide of lead will directly remove COS from gaseous streams free of arsenic. For the purposes of this application, the lead oxide will be termed a sorbent, although that term is not intended to suggest that the COS removal is accomplished by physical adsorption. While not wishing to be bound by any particular theory, it is believed that some chemical reaction is involved between the COS and the sorbent wherein some lead sulfur compound may be formed and a carbon oxide compound liberated. An alternative or parallel reaction may involve the catalytic decomposition of COS to elemental sulfur and CO.

The present invention provides a process for reducing the COS content of a gaseous feedstream free of arsenic which comprises contacting said feedstream with a sorbent dispersed upon a supporting material, said sorbent comprising an oxide of lead. The invention further provides that the supporting material is preferably selected from a high surface area refractory metal oxide or mixtures of refractory metal oxides and most preferably a high surface area alumina. The usual feedstream will contain hydrocarbons. These hydrocarbons in the feedstream have from one to five carbon atoms per molecule with minor amounts of about two percent or less of higher carbon atom molecules such as $C_6$. Preferably, the hydrocarbons in the feedstream have from one to three carbon atoms with minor amounts of about 10 percent or less of hydrocarbons having from 4 to 6 carbon atoms. The feedstream normally includes water vapor and unsaturated hydrocarbons such as olefins.

The COS content of the feedstream is generally in excess of 50 ppb, and following contact with the sorbent, the COS content of the feedstream is reduced to some desired level. For example, a portion of the COS can be removed or the COS can be lowered to a concentration beyond the scope of the sulfur analysis procedure available today, i.e. less than 10 ppb. The amount of COS removal depends on the initial level of COS in the feedstream and on the conditions in the COS removal unit, e.g., temperature and space velocity. In this application the term ppb means parts per billion and ppm means parts per million, and such parts are parts by volume.

DETAILED DESCRIPTION OF THE INVENTION

The charge stock for treatment in accordance with the invention is a gaseous feedstream, preferably a gaseous hydrocarbon feedstream, wherein the hydrocarbons preferably have from one to three carbon atoms per molecule and which feedstream free of arsenic contains COS as an impurity, typically in an amount from about 50 ppb to about 200 ppm or more. Particularly preferred for treatment by the process of this invention are those light hydrocarbon gases free of arsenic obtained by the cracking of heavier petroleum hydrocarbons such as gas oils for producing primarily gasoline.

Preferably the charge stock is free of other gaseous sulfur compounds such as $H_2S$ since these other gaseous sulfur compounds will also be removed by the lead sorbent. That is, the process of this invention will operate in the presence of other gaseous sulfur compounds such as $H_2S$ but the loading of the supported lead oxide before breakthrough of the COS will be seriously impaired. In this context the term breakthrough means the passage of the COS beyond or downstream of the substance intended to remove it and is usually expressed as a percentage of the COS not removed in relation to the COS content of the charge stock. It should be noted here that the sorbent of this invention generally operates on a total removal basis; that is, all of the COS is removed to a level of below 10 ppb, measured as sulfur, until the sorbent is appreciably loaded, at which point only a diminishing fraction of the COS is removed from the charge stock. It should be noted that 10 ppb measured as sulfur is equivalent to about 10 ppb of COS.

The manner of removing gaseous sulfur compounds other than COS from the charge stock may be by any of the methods well known in the art. For example, $H_2S$ and mercaptans can suitably be removed prior to the removal of COS by use of liquid solutions of amines or the use of caustic solutions, e.g. sodium hydroxide or combinations of the above. A portion but not all of the COS may be removed in these units.

The manner of contacting the charge stock with the sorbent of this invention is not critical. Downflow or upflow operation can suitably be employed as can ebullating or fluid bed types of processes. Preferably, the charge stock is passed downflow through a fixed bed of the sorbent which can contain suitably sized particles.

It has been found that the process of this invention works very well at ambient temperature (75° F.; 24° C.) and pressure. However, it has also been found that there is an induction period at ambient conditions before the sorbent is active enough to reduce the COS concentration to a level beyond the scope of analysis, i.e. less than 10 ppb. For example, it has been found that at 75° F. a time period of about 1.5 hours was required before the COS concentration in the product was reduced to substantially zero. By substantially zero is meant beyond the scope of the method of analysis, i.e. less than 10 ppb of COS. The COS content of the product, however, did continuously decrease throughout the induction period. It is believed that the induction period can be reduced by increasing the initial temperature of the reaction to above 75° F., i.e. 100° to 150° F (38° to 66° C.), but such increased temperatures are not required if the induction period can be tolerated.

The temperatures to be employed in the removal of COS from the gaseous hydrocarbon streams of this invention can suitably be from 50° to 600° F. (10° to 316° C.), are usually from 80° to 250° F. (27° to 121° C.), and are preferably from 75° to 200° F. (24° to 93° C.). Temperatures below 50° F. are undesirable because of the increased cost and the decreased activity of the sorbent at those levels. Temperatures above the stated range are undesirable due to the increased expense of operating the process. Apart from economic considerations, however, high temperature levels, which would otherwise promote hydrogenation of olefins present in the feedstream when certain other sorbent materials are employed, are not of concern in the process of the present invention since lead oxide is not a hydrogenation catalyst. Higher operating temperatures may have the advantage in the process of the invention of prolonging the life of the lead oxide sorbent before regeneration is required.

The pressure to be employed in COS removal is suitably atmospheric pressure or below, to 1000 psig (67 atmospheres) or more. Fluid catalytic cracking (FCC) units typically operate to produce product gases, as noted above, at pressures from about 250 to 350 psig (17 to 24 atmospheres). The process of the present invention operates well at atmospheric pressure, but since it is expensive to depressure the FCC absorber gases and repressure the final products for transport through pipelines, it may be desirable to operate the COS removal process at increased pressure of, say, 250 to 350 psig. A limitation on the maximum operating pressure is, however, the effect of pressure on promoting undesirable side reactions such as the polymerization of any olefins which may be present in the feedstream. The gaseous volume hourly space velocity (GVHSV) at standard conditions of temperature and pressure can suitably be from 1,000 to 36,000 v/v/hr. and is usually from 2,000 to 10,000 v/v/hr. However, at the higher space velocities, a lower total loading would be expected.

PREPARATION OF DISPERSED SORBENT

The sorbent employed in the process of the invention is most easily converted to a high surface area form by dispersion onto a suitable high surface area support. The manner of dispersing the sorbent on the supports is not critical and may be accomplished by means well known in the art. One method is described in detail in Example 1 below. Briefly, the technique involves the deposition of load from a solution, preferably aqueous, of a suitable lead salt such as lead nitrate followed by calcining in the presence of air to produce a sorbent comprising lead oxide. The lead salt which is employed must be one which will decompose to the desired lead oxide form on calcining or which can be oxidized to the desired lead oxide form under conditions which will not impair the desired surface area characteristics of the support.

The amount of lead dispersed on the support is suitably from 5 to 50 weight percent and preferably from 10 to 30 weight percent of the total sorbent plus support.

Suitable high surface area supports are those well known in the art as catalyst supports. Examples of suitable supporting materials are the usual porous naturally occurring or synthetically prepared high surface area, i.e., over about 50 m$^2$/g, refractory metal oxides well known in the art as catalyst supports, e.g., alumina, silica, boria, thoria, magnesia or mixtures thereof. Preferably the supporting material is one of the partially dehydrated forms of alumina. More preferably, the alumina is one having a surface area in excess of 50 m$^2$/g, preferably a surface area of 150 to 350 m$^2$/g. Suitable forms of the higher surface area aluminas and their methods of preparation are described in the Kirk-Othmer Encyclopedia of Chemical Technology, Second Edition, Volume 2, pages 41 et seq. Other suitable supports include clays, zeolites and crystalline silica aluminas.

EXAMPLE 1

The purpose of this example is to describe one preparation of a lead oxide material supported by high surface area alumina. An aqueous solution of lead nitrate was prepared by adding 837.21 g. of Pb(NO$_3$)$_2$ (Mallinckrodt Analytical Reagent Grade) to distilled water to give a final volume of 1670 ml. The weight of this solution was 2322 g. and its specific gravity was 1.3904 g/cc. It contained the equivalent of 22.55 percent Pb.

A one-step incipient wetness impregnation of the alumina was carried out by adding, with stirring, the Pb(NO$_3$)$_2$ solution to 2055 g. of 1/16-inch extrudates of a suitable alumina which had previously been heated to 1,000° F. (538° C.) over a period of six hours and held at 1,000° F. (538° C.) for ten hours. The incipient wetness absorptivity of the alumina was 0.8127 ml/g of alumina. The wet material was dried with occasional stirring for 12 hours at 250° F. (121° C.) The dry material was then calcined by raising the temperature to 1,000° F. over a period of 6 hours and holding at 1,000° F. for 9 hours. The final calcined composition analyzed 20 weight percent lead calculated as the metal. The compacted density was 0.804 g/cc and it had a nitrogen B.E.T. surface area of 160 m$^2$/g and a nitrogen pore volume of 0.471.

The final sorbent was off-white in appearance. X-ray analysis of the sorbent showed the presence of some crystalline lead surfate, which is white. There is a small amount of sulfate associated with the alumina base (1.08 percent sulfur), and this probably accounts for the presence of the lead sulfate. A similar preparation using a very low sulfur base (0.08 percent) showed the presence by X-ray diffraction analysis of the complex $4PbO.PbSO_4$ which is also white. The lead nitrate from which the sorbent was prepared is known to decompose at conditions far less severe than the calcination conditions. Thus, while it is not certain, due to the complex chemistry of lead oxides, it is believed the lead is primarily present as PbO or some combination of PbO with lead sulfate due to the light color of the finished sorbent. Other forms of lead oxide such as $PbO_2$, $Pb_2O_3$ and $Pb_2O$ are highly colored.

Technical grade solutions may be employed in the foregoing procedure. The solutions are normally added at room temperature but elevated temperatures may be utilized. The alumina used in this preparation had a nitrogen B.E.T. surface area of 282 m²/g and a pore volume of 0.63 cc/g.

COS REMOVAL

The sorbent of Example 1 was crushed and sized to 40 to 100 mesh. A synthetic charge stock was prepared consisting of 220 ppm of COS in nitrogen.

In Examples 2–4 below, the charge was passed downflow at a constant rate of 60 cc/min (measured at standard temperature and pressure) through a bed of the sorbent at 75° F. (24° C.), atmospheric pressure (745 mm Hg), and a space velocity as noted. The product was analyzed by a Bendix Total Sulfur Monitor Model 8300, which is sensitive to a level of down to 10 ppb of total sulfur (10 ppb of COS). The Bendix unit is designed to continuously measure sulfur-containing compounds present in air. The detector has a linear response to concentrations from 0.01 to 1 part per million. Since the charge stock used in the following experiments had 220 ppm of COS initially, the product was diluted with air to achieve a total level of COS measured as sulfur at or below 1 ppm.

EXAMPLE 2

In this example, the size of the sorbent bed was 2.5 cc (2.365 grams) and the charge stock was passed through at the rate of 60 cc/minute for a space velocity of 1460 volumes of charge per volume of sorbent per hour. The sulfur in the effluent was continuously measured by the Bendix Total Sulfur Monitor after dilution of the effluent with air.

The sulfur in the effluent decreased smoothly over the first 1.5 hours of operation to a level below the scope of the Monitor (equivalent to less than 2 ppm COS in the actual product stream and less than about 10 ppb of COS in the air diluted stream to the Monitor). No sulfur was detected in the effluent for the next 32 hours of operation. Sulfur increased thereafter in the product until at 47 hours the level of COS in the product was 88 ppm (40% breakthrough).

The sulfur level on the sorbent after 32 hours of operation was calculated to be 1.50 weight percent, and after 47 hours of operation the sulfur level was calculated to be 2.21 weight percent.

EXAMPLE 3

In the run for this example, the size of the sorbent bed was decreased to 1.1 cc's (1.029 grams) to effect an increase in the GHSV to 3300 using the constant 60 cc/minute charge rate.

The same continuous sulfur analysis technique used in Example 2 was employed, and the sulfur in the effluent again decreased smoothly over the first 1.5 hours of operation to a level below the scope of the Monitor. No sulfur was detected in the effluent for the next eleven hours. Sulfur increased thereafter in the product unitl at 17.3 hours the level of COS in the product was 88 ppm (40% breakthrough).

The sulfur level on the sorbent after eleven hours was calculated to be 1.13 weight percent, and after 17.3 hours the sulfur level was calculated to be 1.83 weight percent.

EXAMPLE 4

In the run for this example, the same alumina as was used for the support for the lead sorbent for Example 1 was employed to determine the amount of COS removal which could be achieved in the absence of the lead oxide. The alumina was crushed and sieved to 40 to 100 mesh and a bed was prepared from 1.9 cc (2.01 grams) of this alumina. The GHSV was 1900 using the same 60 cc/minute rate of charge.

Only a 5 percent removal of COS was achieved during the first 15 minutes, and there was no decrease in the level of COS, indicating that an induction period was not involved.

The temperature was increased to about 150° F., and initially some 20 percent of the COS was removed (product measured about 180 ppm of COS), and this removal decreased to about 8 percent (product measured over 200 ppm of COS) over the next four hours.

A comparison of Examples 2–4 shows the advantage of using the lead sorbent of this invention.

It is important to realize that on the basis of the above examples and scientific theory which would predict a first order dependence of COS removal with COS concentration, it is anticipated that the sorbent should function proportionally effectively at low COS concentrations. Specifically, for a gaseous charge stock containing one ppm COS, the lower limit of detectability of COS in the undiluted product using the Monitor would be 10 ppb, corresponding to effectively complete removal of COS.

A series of runs was made in which a gas mixture consisting of 217 ppm of COS in nitrogen was passed through a bed of 40–100 mesh PbO sorbent (the same sorbent as shown in Example 1 above) contained in a U-tube immersed in a constant temperature oil bath. In this series of runs the mixture of COS in nitrogen was passed through the bed of lead oxide sorbent at varying temperatures at a constant rate of 47 cc's of gas mixture per minute (measured at standard temperature and pressure). In all of the Examples, the runs were continued until analysis showed that 5 weight percent of the COS in the feed was present in the product, i.e. a 5% breakthrough.

TABLE

| Ex. No. | Size of PbO Sorbent Bed grams | Temp. °C. | Reaction Time Hrs. | Capacity[a] of Sorbent g S/100 grams |
| --- | --- | --- | --- | --- |
| 5 | 2.37 | 22 | 38 | 1.4 |
| 6 | 1.03 | 22 | 12 | 1.0 |
| 7 | 1.05 | 93 | 15 | 1.2 |
| 8 | 1.08 | 93 | 22 | 1.8 |
| 9[b] | 1.24 | 93 | >35 | >2.4 |

[a]Calculated from COS inlet flow rate.
[b]44 cc/min (measured at standard temperature and pressure) of propylene added.

Referring to the above Table, fresh PbO sorbent was used in each example. Since the flow rate of charge was constant (47 cc's) for Examples 5–8, the space velocity was changed by varying the size of the PbO sorbent bed. A comparison of Example 6 with Example 5 shows that an increased space velocity decreases capacity of the bed for the removal of COS.

A comparison of Example 6 with Examples 7 and 8 shows that an increase in temperature tends to increase capacity.

Example 9 shows that the added presence of propylene unexpectedly increases the capacity of the sorbent for COS removal. In Example 9, the feed rate was a total of 91 cc/min (made up of 47 cc of nitrogen containing 217 ppm of COS and 44 cc of propylene). From Examples 5 and 6 an increase in space velocity would be expected to produce a decrease in capacity for COS removal. In Example 9, the space velocity is about doubled over Examples 7 and 8, and unexpectedly the capacity of the sorbent for COS removal increases.

Resort may be had to such variations and modifications as fall within the spirit of the invention and the scope of the appended claims.

We claim:

1. A process for reducing the COS content of a gaseous feedstream free of arsenic which comprises:
    contacting said feedstream at a temperature of 80° F. to 250° F. with a sorbent dispersed upon a carrier material, said sorbent consisting essentially of lead oxide, and
    recovering a product gas stream containing less than 10 ppb of COS.

2. A process in accordance with claim 1 wherein the gaseous feedstream is a hydrocarbon containing feedstream.

3. A process according to claim 2 wherein said supporting material is a high surface area alumina.

4. A process according to claim 3 wherein said lead oxide is PbO.

5. A process according to claim 4 wherein said hydrocarbon is propylene.

6. A process in accordance with claim 3 wherein the feedstream contains COS in amounts in excess of 50 ppb.

7. A process in accordance with claim 6 wherein said hydrocarbons in said feedstream have from one to five carbon atoms per molecule.

8. A process in accordance with claim 7 wherein said lead oxide is PbO.

9. A process in accordance with claim 8 wherein the amount of PbO is from 10 to 30 weight percent of the total weight of the sorbent plus support.

10. A process in accordance with claim 3 wherein said alumina has a surface area from 150 to 360 m$^2$/g.

11. A process in accordance with claim 2 wherein said hydrocarbons in said feedstream have from one to five carbon atoms per molecule.

12. A process in accordance with claim 2 wherein the hydrocarbon-containing feedstream is substantially free of sulfur-containing compounds except COS.

13. A process according to claim 12 wherein said lead oxide is PbO and said supporting material is a high surface area alumina.

14. A process according to claim 1 wherein the gaseous hydrocarbon feedstream contains other sulfur compounds in addition to COS and is initially treated with a liquid solution selected from the group consisting of an amine solution and a caustic solution to reduce the concentration of such other sulfur compounds.

* * * * *

UNITED STATES PATENT AND TRADEMARK OFFICE
CERTIFICATE OF CORRECTION

PATENT NO. : 4,009,009
DATED : February 22, 1977
INVENTOR(S) : Franklin E. Massoth and John E. Young, Jr.

It is certified that error appears in the above–identified patent and that said Letters Patent are hereby corrected as shown below:

Col. 8, line 19 - "360 $m^2/g$" should be --350 $m^2/g$ --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*